US012754467B2

(12) United States Patent
Hsu

(10) Patent No.: US 12,754,467 B2
(45) Date of Patent: Oct. 6, 2026

(54) REFLECTIVE DIFFUSION DEVICE AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 332 days.

(21) Appl. No.: 18/449,717

(22) Filed: Aug. 15, 2023

(65) Prior Publication Data

US 2024/0077795 A1 Mar. 7, 2024

(30) Foreign Application Priority Data

Sep. 2, 2022 (CN) ......................... 202211069333.0

(51) Int. Cl.
*G03B 21/20* (2006.01)
*G03B 21/16* (2006.01)

(52) U.S. Cl.
CPC ......... *G03B 21/2066* (2013.01); *G03B 21/16* (2013.01); *G03B 21/204* (2013.01)

(58) Field of Classification Search
CPC ... G03B 21/2066; G03B 21/16; G03B 21/204
USPC ........................................................... 353/98
See application file for complete search history.

(56) References Cited

U.S. PATENT DOCUMENTS 5,257,051 A 10/1993 Bushroe
10,670,954 B2 6/2020 Hsu et al.
2011/0058381 A1 3/2011 Chiang et al.
2012/0327380 A1 12/2012 Iwabayashi
2015/0062903 A1 3/2015 Hu et al.
2016/0026076 A1 1/2016 Hu
(Continued)

FOREIGN PATENT DOCUMENTS

CN 1653361 8/2005
CN 102692800 9/2012
(Continued)

OTHER PUBLICATIONS

Office Action of related U.S. application, U.S. Appl. No. 18/358,036, issued on Oct. 16, 2025, p. 1-p. 13.
(Continued)

*Primary Examiner* — Magda Cruz
(74) *Attorney, Agent, or Firm* — JCIPRNET

(57) ABSTRACT

A reflective diffusion device includes a driving element having a rotation shaft, a reflective element including a central axis and disposed on the driving element, and a diffusion element. The central axis and the rotation shaft are collinear. The diffusion element is disposed on at least one portion of the reflective element, and the driving element drives the reflective element and the diffusion element to rotate along the central axis. A laser beam enters the diffusion element along an incident direction, is transmitted to the reflective element and reflected by the reflective element, and exits from the diffusion element along an exit direction to generate a diffusion beam. An incident angle between the incident direction and the central axis is greater than 0 degree, and an emergent angle between the exit direction and the central axis is greater than or equal to 0 degree.

14 Claims, 17 Drawing Sheets

(56) References Cited

U.S. PATENT DOCUMENTS

| | | | | |
|---|---|---|---|---|
| 2016/0291315 | A1 | 10/2016 | Hsu | |
| 2016/0349606 | A1 | 12/2016 | Nishimori | |
| 2020/0174355 | A1* | 6/2020 | Liu | G03B 21/2013 |
| 2020/0225462 | A1 | 7/2020 | Hsu et al. | |
| 2021/0148544 | A1* | 5/2021 | Chen | G03B 21/208 |
| 2021/0364901 | A1* | 11/2021 | Liao | G03B 21/2053 |
| 2023/0111590 | A1* | 4/2023 | Chen | G02B 5/09 359/630 |
| 2023/0244131 | A1* | 8/2023 | Hirahara | G03B 21/208 353/98 |

FOREIGN PATENT DOCUMENTS

| | | | |
|---|---|---|---|
| CN | 203082725 | | 7/2013 |
| CN | 103343922 | | 10/2013 |
| CN | 103616770 | | 3/2014 |
| CN | 103631080 | | 3/2014 |
| CN | 103777445 | | 5/2014 |
| CN | 104595757 | | 5/2015 |
| CN | 104880899 | | 9/2015 |
| CN | 105005418 | | 10/2015 |
| CN | 105892200 | | 8/2016 |
| CN | 106062628 | | 10/2016 |
| CN | 102959320 | | 3/2017 |
| CN | 106483746 | | 3/2017 |
| CN | 106641887 | | 5/2017 |
| CN | 106662305 | | 5/2017 |
| CN | 106773482 | | 5/2017 |
| CN | 107272315 | | 10/2017 |
| CN | 206647789 | | 11/2017 |
| CN | 107885020 | | 4/2018 |
| CN | 106886124 | | 2/2019 |
| CN | 208537894 | | 2/2019 |
| CN | 109683443 | | 4/2019 |
| CN | 110618575 | | 12/2019 |
| CN | 110967902 | | 4/2020 |
| CN | 211014994 | | 7/2020 |
| CN | 112925097 | | 6/2021 |
| CN | 214252860 | | 9/2021 |
| JP | H06111614 | | 4/1994 |
| JP | H11176220 | | 7/1999 |
| JP | 2003207325 | | 7/2003 |
| JP | 2006208053 | | 8/2006 |
| JP | 2007234407 | | 9/2007 |
| JP | 2011077056 | | 4/2011 |
| JP | 2015184407 | | 10/2015 |
| JP | 2016136461 | A | 7/2016 |
| JP | 2021077588 | | 5/2021 |
| JP | 2021092728 | | 6/2021 |
| KR | 20140055220 | | 5/2014 |
| WO | 2020135300 | A1 | 7/2020 |
| WO | 2021260877 | | 12/2021 |

OTHER PUBLICATIONS

"Office Action of China Counterpart Application", issued on Mar. 23, 2026, p. 1-p. 14.

"Office Action of China Counterpart Application", issued on Mar. 23, 2026, p. 1-p. 20.

* cited by examiner

REFLECTIVE DIFFUSION DEVICE AND PROJECTION DEVICE

CROSS-REFERENCE TO RELATED APPLICATION

This application claims the priority benefit of China application serial no. 202211069333.0, filed on Sep. 2, 2022. The entirety of the above-mentioned patent application is hereby incorporated by reference herein and made a part of this specification.

BACKGROUND OF THE INVENTION

1. Field of the Invention

The invention relates to a light beam diffusion device and a projection device and particularly relates to a reflective diffusion device and a projection device.

2. Description of Related Art

A projection imaging device (such as a projector) with use of a laser beam as a light source often encounters a speckle problem that may pose an impact on the imaging quality. In order to solve the problem of laser speckles, the general projection device adopts a static diffusion sheet or a high-speed rotating diffusion wheel. When the laser beam penetrates the diffusion sheet or the diffusion wheel, the energy density of the laser beam is reduced, and thereby the laser beam may be scattered to eliminate concentrated speckles. However, in such a projection device, an incident laser beam and an exit laser beam are located on two sides of the transmissive diffusion sheet or the diffusion wheel, respectively, which may limit the layout of light paths and is detrimental to space utilization.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide a reflective diffusion device system which is conducive to space utilization.

Other objectives and advantages of the invention may be further understood from the technical features disclosed in the invention.

In order to achieve one, some, or all of the aforementioned objectives or other objectives, an embodiment of the invention provides a reflective diffusion device that is adapted to reflect and diffuse a laser beam emitted from a light source module, and the reflective diffusion device includes a driving element, a reflective element, and a diffusion element. The driving element has a rotation shaft. The reflective element includes a central axis and is disposed on the driving element, and the central axis and the rotation shaft are collinear. The diffusion element is disposed on at least one portion of the reflective element, where the driving element is configured to drive the reflective element and the diffusion element to rotate along the central axis. The laser beam enters the diffusion element along an incident direction, is transmitted to the reflective element, is reflected by the reflective element, and exits from the diffusion element along an exit direction to generate a diffusion beam. An incident angle exists between the incident direction and the central axis, an emergent angle exists between the exit direction and the central axis, the incident angle is greater than 0 degree, and the emergent angle is greater than or equal to 0 degree.

In order to achieve one, some, or all of the aforementioned objectives or other objectives, an embodiment of the invention provides a projection device that includes an illumination module, a light valve, and a projection lens. The illumination module is configured to provide an illumination beam. The light valve is disposed on a path of the illumination beam to convert the illumination beam into an image beam. The projection lens is disposed on a path of the image beam and configured to project the image beam out of the projection device. The illumination module includes a light source module, a reflective diffusion device, and a wavelength conversion device. The light source module is configured to emit a laser beam. The reflective diffusion device includes a driving element, a reflective element, and a diffusion element. The driving element has a rotation shaft. The reflective element includes a central axis and is disposed on the driving element, and the central axis and the rotation shaft are collinear. The diffusion element is disposed on at least one portion of the reflective element, where the driving element is configured to drive the reflective element and the diffusion element to rotate along the central axis. The laser beam enters the diffusion element along an incident direction, is transmitted to the reflective element, is reflected by the reflective element, and exits from the diffusion element along an exit direction to generate diffusion beam. An incident angle exists between the incident direction and the central axis, an emergent angle exists between the exit direction and the central axis, the incident angle is greater than 0 degree, and the emergent angle is greater than or equal to 0 degree. The wavelength conversion device is disposed on a path of the diffusion beam to convert the diffusion beam into a conversion beam, where the conversion beam transmitted out of the illumination module serves as the illumination beam provided by the illumination module.

In view of the above, the reflective diffusion device provided in one or more embodiments of the invention includes the driving element, the reflective element, and the diffusion element and is adapted to reflect and diffuse the laser beam emitted from the light source module. The driving element drives the reflective element to rotate along the central axis of the reflective element. Through the cooperation of the reflective element and the diffusion element, the incident laser beam and the emergent diffusion beam are located on the same side of the reflective diffusion device, which is conducive to space utilization and enhances flexibility of the light path design. Besides, the laser beam passes through the diffusion element at least twice, which may achieve a more favorable light beam diffusion effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
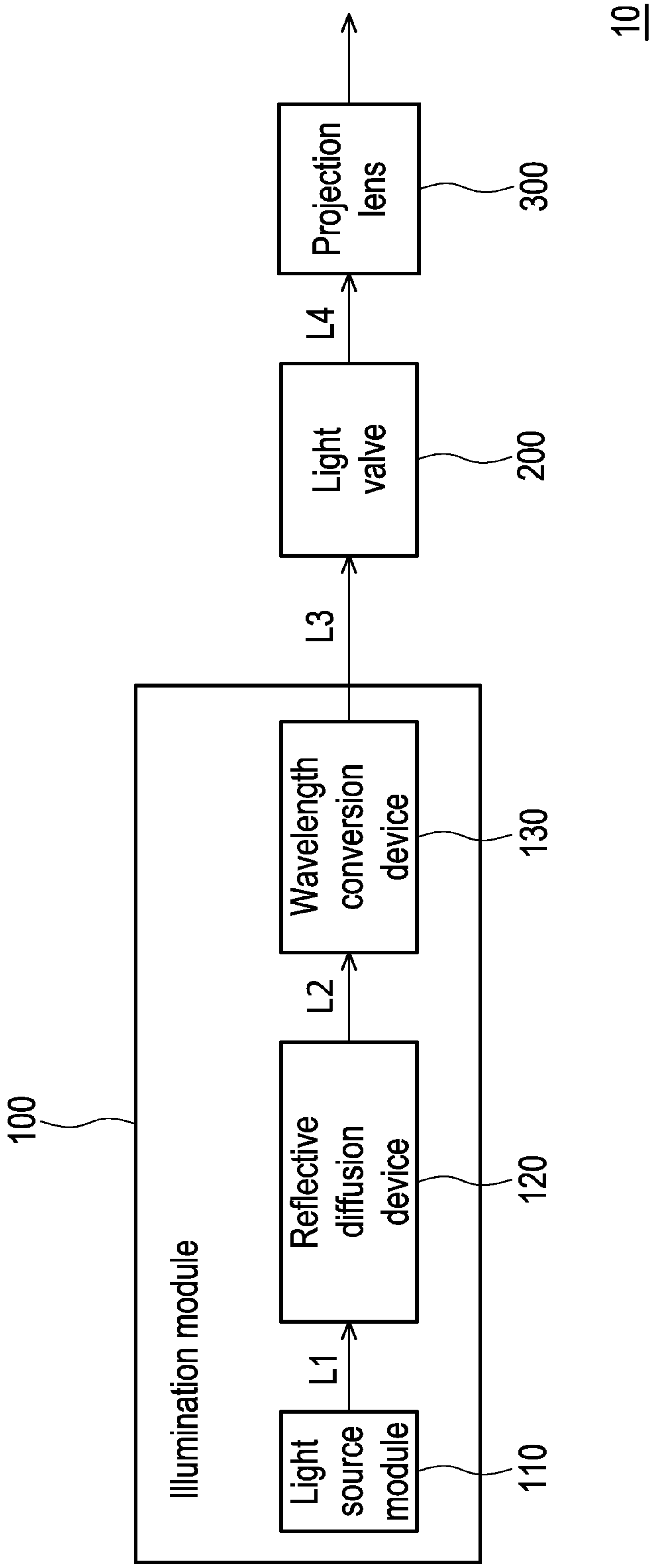
FIG. 1 is a schematic view of a projection device according to an embodiment of the invention.

FIG. 1 is a schematic view of a projection device according to an embodiment of the invention. With reference to FIG. 1, the projection device 10 includes an illumination module 100, a light valve 200, and a projection lens 300. The projection device 10 is configured to convert an illumination beam L3 into an image beam L4 and project the image beam L4 out of the projection device 10.

The illumination module 100 includes a light source module 110, a reflective diffusion device 120, and a wavelength conversion device 130, and the illumination module 100 is configured to provide the illumination beam L3. The light source module 110 is configured to emit a laser beam L1. In the embodiment, the light source module 110 is, for instance, one or more laser emitting elements. The laser beam L1 emitted from the light source module 110 is, for instance, a blue laser beam, but the laser beam L1 may also be of another color and is not limited to the blue laser beam provided herein.

The reflective diffusion device 120 is adapted to reflect and diffuse the laser beam L1 emitted from the light source module 110 to generate a diffusion beam L2. Generally, due to the high energy density of the laser beam, concentrated speckles are apt to be formed, which may affect the imaging quality. The laser beam L1 from the light source module 110 passes through the reflective diffusion device 120 and then diverges into the diffusion beam L2, thus reducing the energy density and achieving the effect of eliminating the speckles.

The wavelength conversion device 130 is disposed on a transmission path of the diffusion beam L2 to convert the diffusion beam into a conversion beam. The wavelength conversion device 130 is, for instance, a phosphor wheel and may be equipped with at least one wavelength conversion region and at least one non-wavelength conversion region. The at least one wavelength conversion region and the at least one non-wavelength conversion region may cut into the transmission path of the diffusion beam L2 in turn. For instance, the at least one wavelength conversion region is equipped with phosphor powder. When the at least one wavelength conversion region cuts into the transmission path of the diffusion beam L2, the incident diffusion beam L2 may be converted into a conversion beam of different wavelengths; for instance, the blue diffusion beam L2 may be converted into a yellow conversion beam. However, the wavelength of the conversion beam may be adjusted according to design requirements and is not limited to what is disclosed herein. The conversion beam is transmitted out of the illumination module 100, and in this time sequence, the conversion beam serves as the illumination beam L3 provided by the illumination module 100. When the at least one non-wavelength conversion region cuts into the transmission path of the diffusion beam L2, the diffusion beam L2 may, for instance, be reflected or penetrate the non-wavelength conversion region, and the diffusion beam L2 is then transmitted out of the illumination module 100. In this time sequence, the diffusion beam L2 serves the illumination beam L3 provided by the illumination module 100; that is, the illumination beam L3 may be the conversion beam or the diffusion beam L2 in different time sequences The light valve 200 is disposed on a path of the illumination beam L3 to convert the illumination beam L3 into the image beam L4. In the embodiment, the light valve 200 is, for instance, a reflective optical modulator, such as a digital micro-mirror device (DMD), a liquid crystal on silicon panel (LCoS panel), and so on. In some embodiments, the light valve 200 may be, for instance, a transmissive optical modulator, such as a transmissive liquid crystal display panel, an electro-optical modulator, a magneto-optic modulator, an acousto-optic modulator (AOM), and so on. However, the invention is not limited thereto. Certainly, the light valve 200 may also be another optical lens or the like and should not be limited to what is disclosed herein, and so on.

The projection lens 300 is disposed on a path of the image beam L4 from the light valve 200 and is configured to project the image beam L4 out of the projection device 10, and the projected image beam L4 is disposed on a screen, a wall surface, or any other projection target. In the embodiment, the projection lens 300 includes, for instance, a combination of one or more optical lenses having reflective surfaces and diopters, such as a biconcave lens, a biconvex lens, a concave-convex lens, a convex-concave lens, a plano-convex lens, a plano-concave lens, and various combinations thereof. In an embodiment, the projection lens 300 may also include a planar optical lens which may reflect the image beam L4 from the light valve 200 or have the image beam L4 penetrate, so as to project the image beam L4 out of the projection device 10.

Figure 2A:
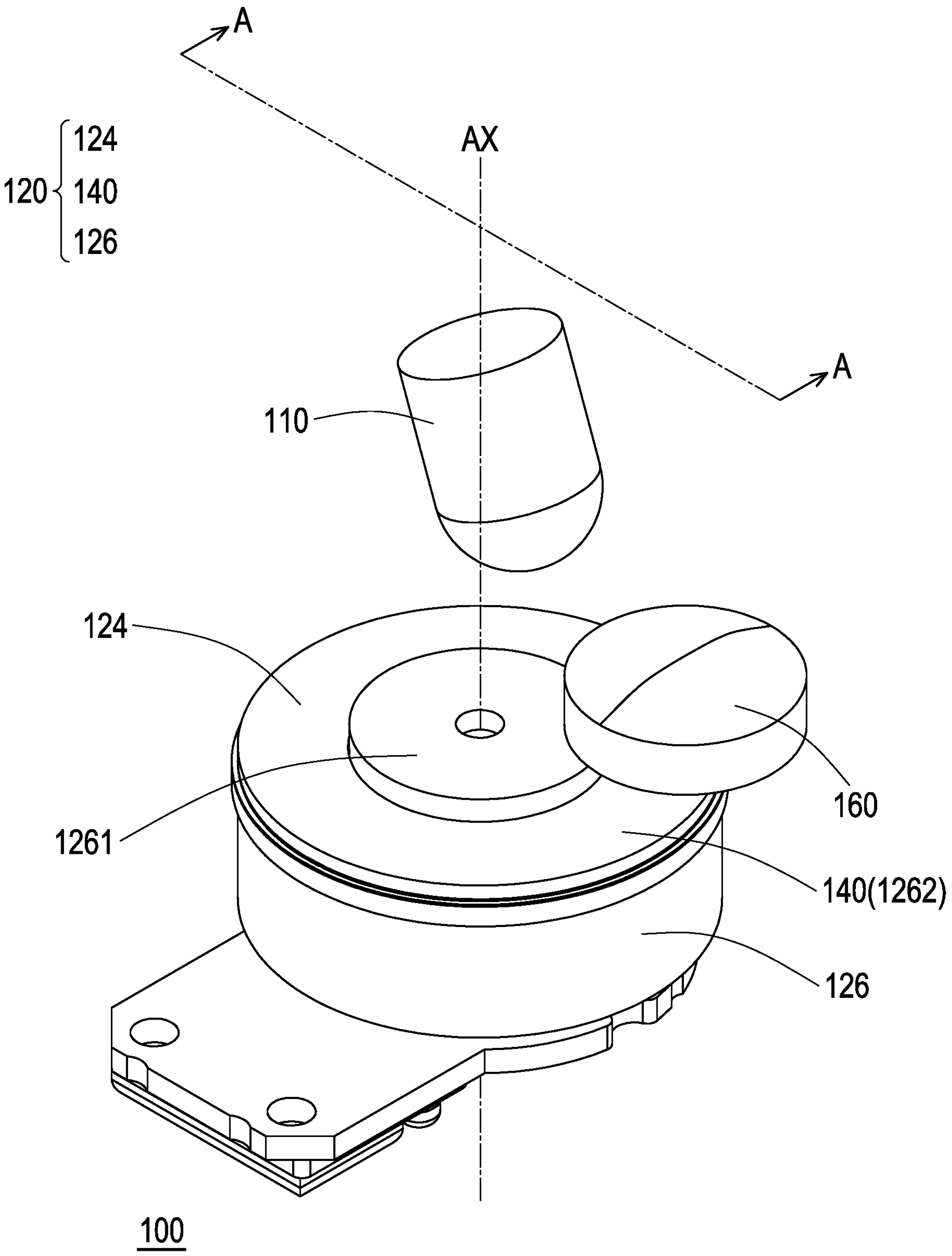
FIG. 2A is a schematic three-dimensional view of a portion of an illumination module in the projection device depicted in FIG. 1.
Figure 2B:
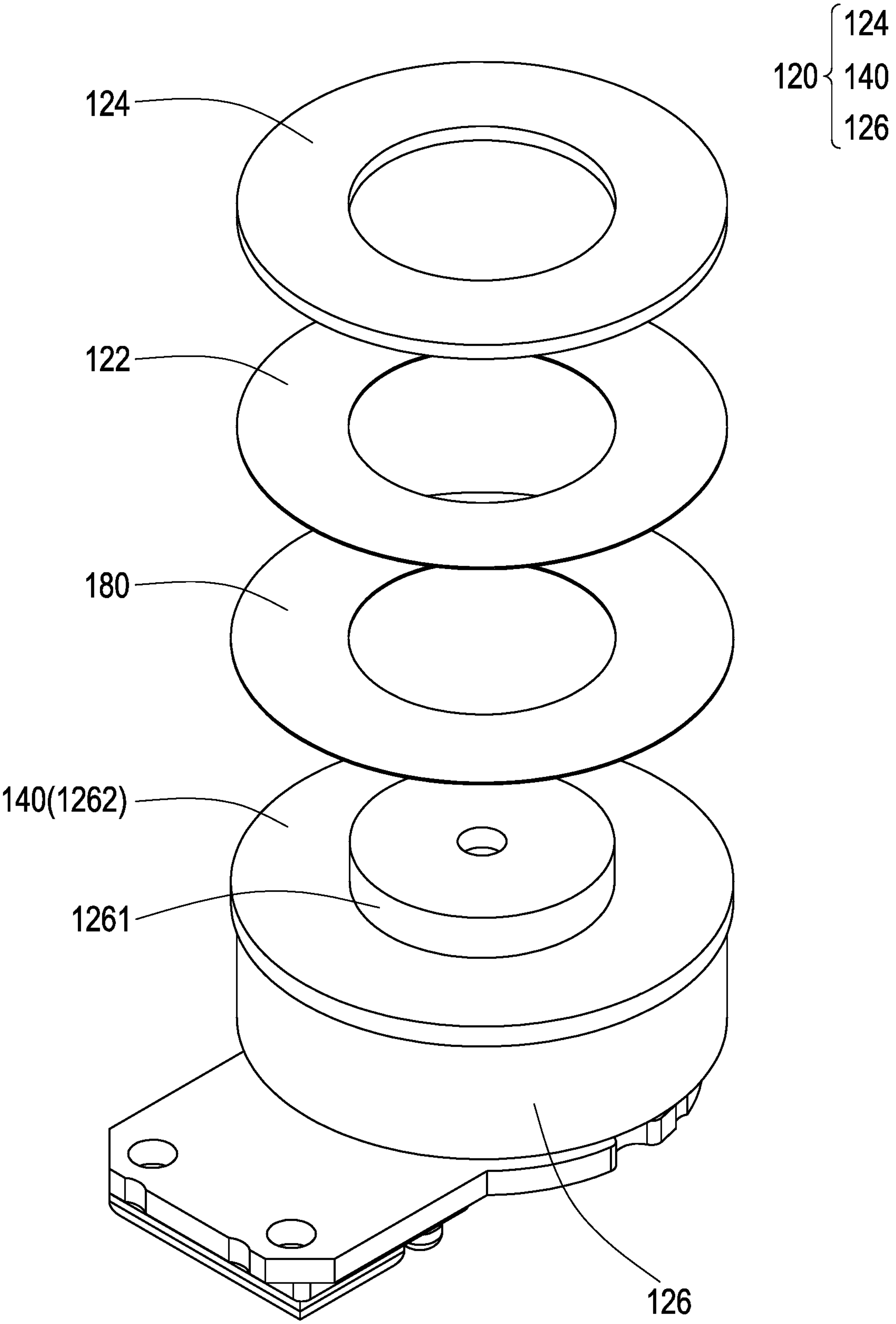
FIG. 2B is a schematic exploded view of FIG. 2A.

FIG. 2A is a schematic three-dimensional view of a portion of the illumination module 100 in the projection device depicted in FIG. 1. FIG. 2B is a schematic exploded view of FIG. 2A. It should be noted that the light source module and a first lens in FIG. 2B are hidden.

With reference to FIG. 2A and FIG. 2B, in the embodiment, the reflective diffusion device 120 includes a driving element 126, a reflective element 140 (FIG. 2B), and a diffusion element 124. The driving element 126 has a rotation shaft 1261, the reflective element 140 is an end portion 1262 of the driving element 126 (FIG. 2B), and the reflective element 140 is, for instance, a reflective surface of the end portion 1262 facing the light source module 110. In the embodiment, the end portion 1262 is made of a metal material, for instance. The reflective element 140 has a central axis AX. An outer diameter of the reflective element 140 is equal to an outer diameter of the end portion 1262 of the driving element 126. The central axis AX and the rotation shaft 1261 are collinear.

The reflective element 140 (the end portion 1262) is configured to reflect the laser beam L1 emitted from the light source module 110 (FIG. 1 and FIG. 2C) and may be a ring-shaped heat dissipation substrate, and the diffusion element 124 is sleeved on the rotation shaft 1261 of the driving element 126 through an adhesive layer 180 (FIG. 2B). In the embodiment, the reflective diffusion device 120 may further include a ring-shaped reflective layer 122, which is coated onto the end portion 1262 of the driving element 126, surrounds the rotation shaft 1261, and is located between the reflective element 140 (the end portion 1262) and the diffusion element 124. A material of the reflective layer 122 may include a plated dielectric material, silver, or aluminum, or reflective particles mixed with organic glue and inorganic glue. Certainly, the structure and the material of the reflective element 140 are not limited to what is disclosed herein.

The adhesive layer 180 provided in the embodiment is, for instance, a coating layer or a glue layer configured to fix the diffusion element 124 onto the reflective layer 122 or/and the reflective element 140 (the end portion 1262), but the type of the adhesive layer 180 is not limited to what is disclosed herein.

The diffusion element 124 is disposed on at least one portion of the reflective element 140, and an outer diameter of the diffusion element 124 is less than or equal to the outer diameter of the reflective element 140. The diffusion element 124 is conformal to the reflective element 140 and is, for instance, conformally disposed on the reflective element 140 by coating, adhesion, or back plating. For instance, the reflective element 140 may include a plane, a bowl-shaped curved surface, or at least one portion of a conical surface (the at least one portion of the conical surface refers to a ring-shaped conical surface formed by truncating an apex of a corn), and thus the diffusion element 124 is conformal to the plane, the bowl-shaped curved surface, or at least one portion of the conical surface of the reflective element 140. Certainly, the geometric shape of the reflective element 140 and the geometric shape the diffusion element 124 are not limited to what is disclosed herein. In the embodiment, the reflective element 140 (the end portion 1262) is a plane, and the diffusion element 124 is conformally disposed on the planar reflective element 140 (the end portion 1262).

The diffusion element 124 may include a light transmission material having microstructures located on a surface of the diffusion element 124, an atomization layer having scattered particles inside, or a combination of the light transmission material and the atomization layer, and the diffusion element 124 is configured to diffuse the laser beam L1 emitted from the light source module 110 (FIG. 1). The diffusion element 124 is, for instance, made by glass etching, made of an organic glue mixed with a diffusion material, or made of an inorganic glue mixed with a diffusion material, and the diffusion material may be silicon oxide or a ceramic material. Certainly, the material and the structure of the diffusion element 124 are not limited to what is disclosed herein and may be determined according to actual design requirements.

In the embodiment, the driving element 126 is, for instance, a motor. The driving element 126 is configured to drive the reflective element 140 and the diffusion element 124 to rotate along the central axis AX, so that the laser beam L1 incident on the reflective diffusion device 120 forms a diffusion beam L2 (FIG. 1).

Figure 2C:
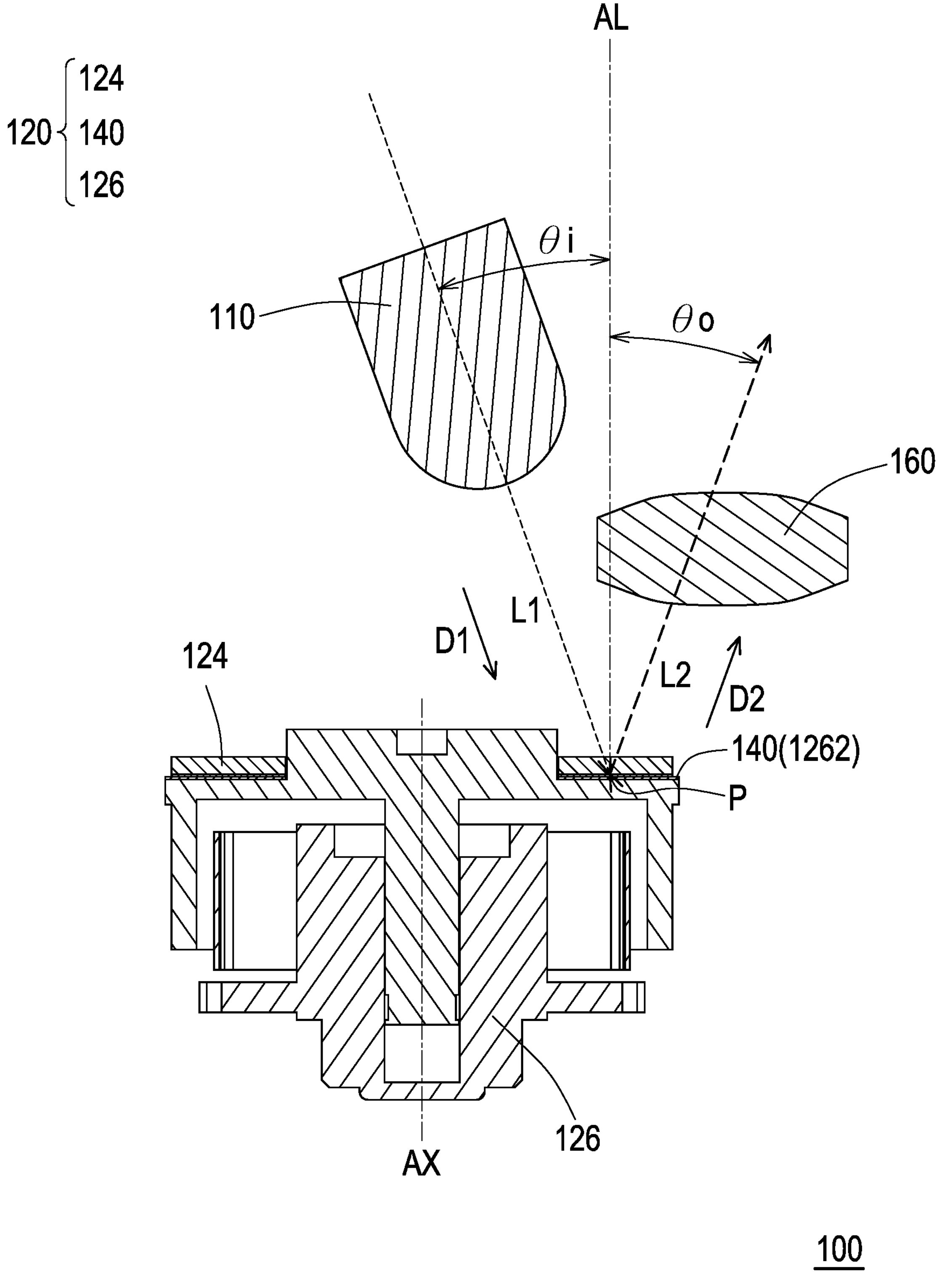
FIG. 2C is a schematic cross-sectional view of FIG. 2A taken along a section line A-A.

FIG. 2C is a schematic cross-sectional view of FIG. 2A taken along a section line A-A. With reference to FIG. 2C, in detail, the light source module 110 is disposed above the diffusion element 124; namely, the diffusion element 124 is located between the reflective element 140 and the light source module 110. The laser beam L1 is emitted from the light source module 110, is firstly incident to a position P of the diffusion element 124 along an incident direction D1 and transmitted to the reflective element 140 (FIG. 2B), is reflected by the reflective element 140, and exits from the diffusion element 124 in an exit direction D2 to generate the diffusion beam L2.

On the other hand, in the embodiment, an incident angle $\theta i$ exists between the incident direction D1 and the central axis AX, and an emergent angle $\theta o$ exists between the exit direction D2 and the central axis AX. In order to clearly show the incident angle and the emergent angle, FIG. 2C illustrates an auxiliary line AL that is parallel to the central axis AX and passes through the position P. The incident angle $\theta i$ is shown as an angle between the incident direction D1 and the auxiliary line AL, and the emergent angle θo is shown as an angle between the exit direction D2 and the auxiliary line AL. In the embodiment, the incident angle θi is greater than 0 degree, and the emergent angle θo is greater than or equal to 0 degree. For instance, the laser beam L1 enters the diffusion element 124 at the incident angle θi equal to 3 degrees to 87 degrees, thereby effectively eliminating the concentrated speckles resulting from the laser beam L1. In addition, by adjusting the degree of the incident angle θi, the effect of adjusting the emergent angle θo may be achieved, which is conducive to enhancement of the flexibility of the light path design.

It is worth noting that due to the design of light reflection, the incident direction D1 and the exit direction D2 of the laser beam L1 are both located on the same side of the reflective diffusion device 120, and the laser beam L1 does not penetrate the reflective diffusion device 120. Thereby, space in the direction of the central axis AX is saved, which enhances the flexibility of internal space utilization of the projection device 10. According to actual tests, the volume of the projection device 10 may be reduced by 10% or more in comparison with the volumes of conventional projection devices, and thus the weight and the cost of the projection device 10 may be reduced.

Figure 2D:
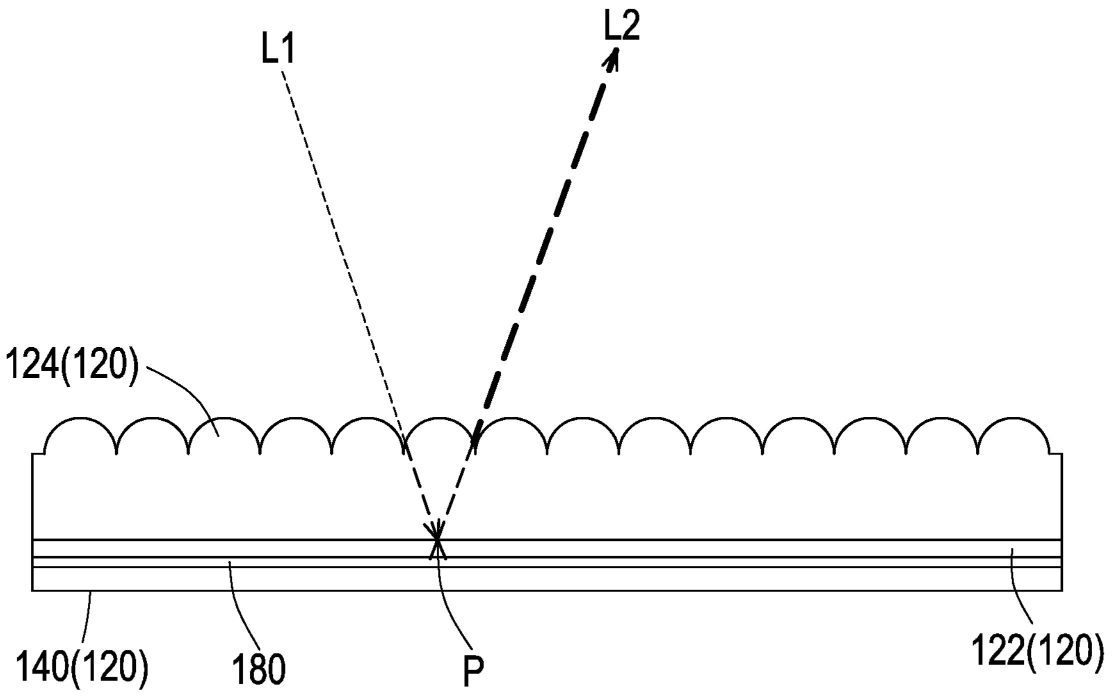
FIG. 2D is a schematic partial enlarged view of FIG. 2A.

FIG. 2D is a schematic partial enlarged view of FIG. 2A. With reference to FIG. 2D, the laser beam L1 passes through the diffusion element 124 in the process of entering or exiting from the reflective element 140. For instance, the laser beam L1 enters the diffusion element 124 in a collimation state and passes through the diffusion element 124 to generate a light beam with a diffusion angle of 1.5 degrees. When the laser beam L1 enters the diffusion element 124 and exits from the position P, the laser beam L1 passes through the diffusion element 124 twice; that is, the diffusion beam L2 is generated by diffusing the laser beam L1 twice, and the exited diffusion beam L2 has a diffusion angle of 3 degrees. Certainly, the degree of the diffusion angle of the light beam passing through the diffusion element 124 is not limited to what is disclosed herein and is determined according to design requirements. Hence, the illumination module 100 needs to be equipped with one single diffusion element 124, and the diffusion angle of the incident light beam may be twice as large as that of the transmissive diffusion sheet or the diffusion wheel, so that the diffusion beam L2 with the sufficient diffusion effect may be generated, and the speckles may be effectively prevented.

As shown in FIG. 2C, in the conventional projection device, the size of the transmissive diffusion sheet or the diffusion wheel in a radial direction should be greater than the size of the driving element in the radial direction, so as to prevent the driving element from blocking the travelling laser beam penetrating the diffusion sheet or the diffusion wheel. In contrast, the laser beam L1 provided in the embodiment does not penetrate the reflective element 140, and thus the driving element 126 located below the reflective element 140 and the diffusion element 124 does not hinder the travelling of the laser beam L1. Therefore, the size of the diffusion element 124 may be significantly reduced. According to actual measurement, compared with the conventional transmissive diffusion sheet or the conventional diffusion wheel, the volume of the diffusion element 124 of the reflective diffusion device 120 may be reduced by 30% or more, which is conducive to space utilization and cost saving.

After the diffusion beam L2 leaves the reflective diffusion device 120, it enters and penetrates a first lens 160. The first lens 160 is disposed above the diffusion element 124 and is located on the transmission path of the diffusion beam L2 but not on the transmission path of the laser beam L1. The first lens 160 is, for instance, a collimation lens and may convert the diffusion beam L2 into a parallel light beam, but the type and the function of the first lens 160 are not limited to what is disclosed herein. After penetrating the first lens 160, the diffusion beam L2 enters the subsequent light path system (not shown) to be further utilized and processed.

Figure 3A:
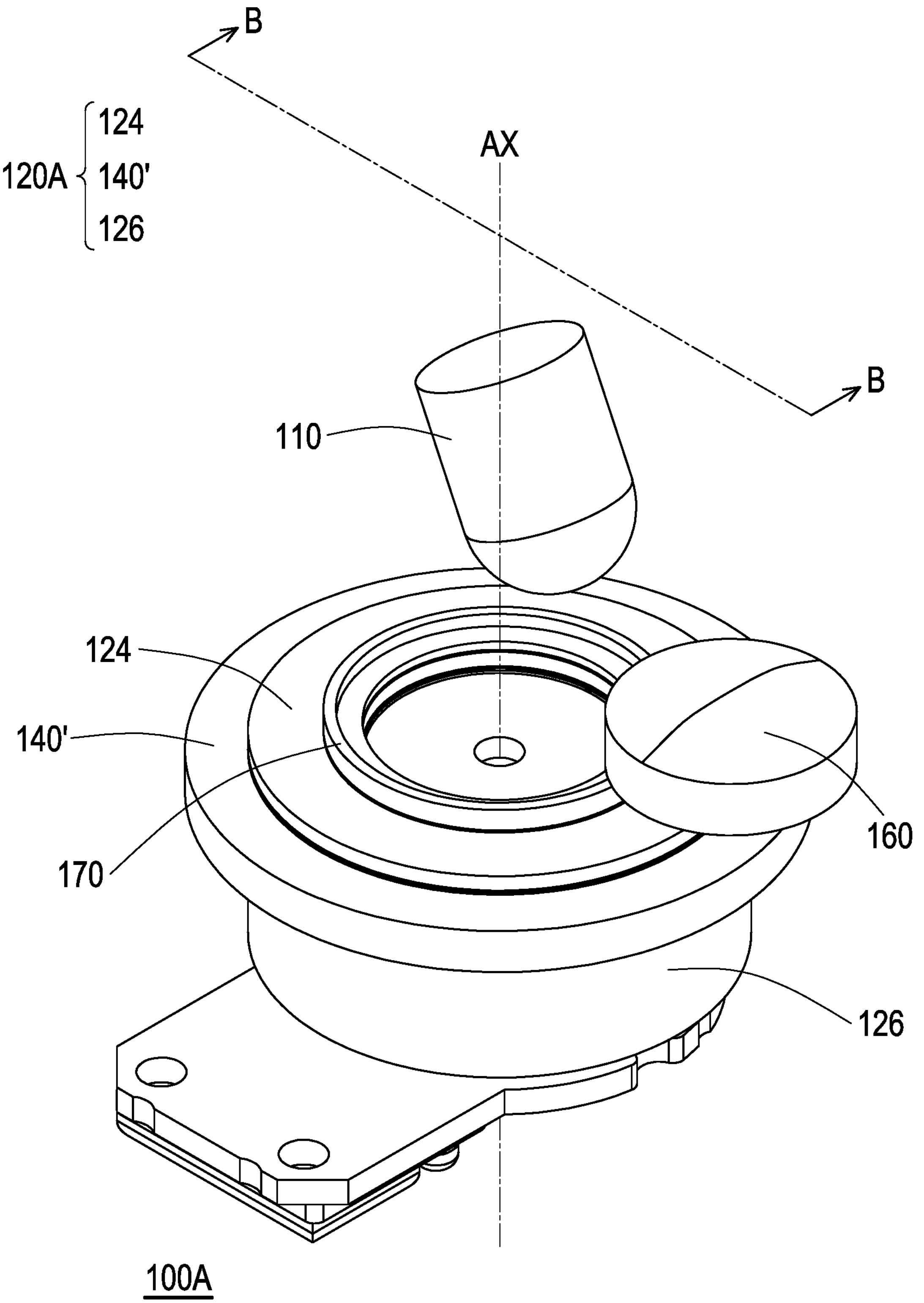
FIG. 3A is a schematic three-dimensional view of a portion of an illumination module according to another embodiment of the invention.
Figure 3B:
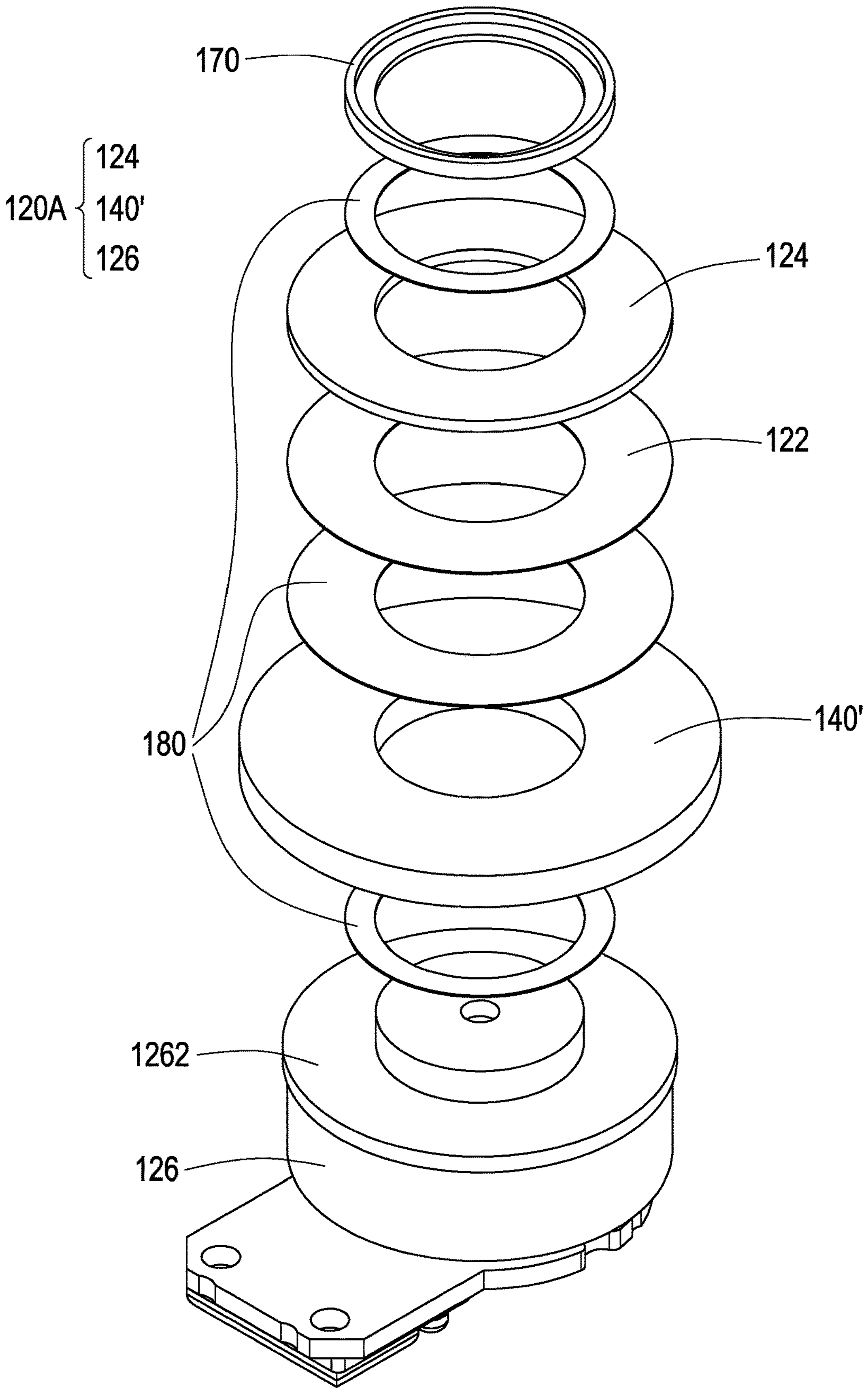
FIG. 3B is a schematic exploded view of FIG. 3A.

FIG. 3A is a schematic three-dimensional view of a portion of an illumination module according to another embodiment of the invention. FIG. 3B is a schematic exploded view of FIG. 3A. It should be noted that the light source module and the lens in FIG. 3B are hidden. Please refer to FIG. 3A and FIG. 3B. An illumination module 100A provided in the embodiment is similar to the illumination module 100, while the difference therebetween lies in that a reflective diffusion device 120A of the illumination module 100A includes a reflective element 140' and a weight block 170. The reflective element 140' provided in the embodiment is an independent heat dissipation substrate, the diffusion element 124 is fixed to one side of the reflective element 140' facing the light source module 110 through the adhesive layer 180 (FIG. 3B), and the reflective element 140' is fixed to the end portion 1262 of the driving element 126 through the adhesive layer 180 (FIG. 2B).

A material of the reflective element 140' provided in the embodiment includes ceramic, metal, or a composite material and is configured to dissipate the heat generated by the laser beam L1 (FIG. 1) entering the reflective element 140', so as to prevent the driving element 126 from being overheated and thus damaged or non-operated, but the structure and the material of the reflective element 140' are not limited to what is disclosed herein. In addition, the reflective element 140' may be formed by stamping, mechanical processing, casting, diecasting, injection, and so on, but the method of forming the reflective element 140' is not limited to what is disclosed herein. In other embodiments, the reflective diffusion device 120A may further include a reflective layer 122 disposed between the reflective element 140' and the diffusion element 124 and configured to enhance the light reflection effect of the reflective element 140'.

It is worth mentioning that even though the rotation shaft 1261 of the driving element 126 of the reflective diffusion device 120 of the illumination module 100 may achieve the heat dissipation effects, the effects of heat dissipation are limited. An outer diameter of the reflective element 140' of the reflective diffusion device 120A provided in the embodiment is greater than or equal to the outer diameter of the driving element 126, and the heat dissipation area is large; hence, compared to the illumination module 100, the illumination module 100A provided herein may achieve better heat dissipation effects.

The weight block 170 is connected to the driving element 126 and is fixed to one side of the diffusion element 124 facing the light source module 110 through the adhesive layer 180. The weight block 170 has a balance calibration function. In detail, glue or metal is disposed on the weight block 170 to balance the eccentricity induced when the reflective diffusion device 120A rotates, and the weight block 170 is configured to calibrate and fix the elements as a supporting frame. In addition, the weight block 170 strengthens the connection between the diffusion element 124 and the driving element 126, and there is a gap (not shown) in a radial direction between the weight block 170 and the diffusion element 124; therefore, the diffusion element 124 may be prevented from pressing against the driving element 126 due to thermal expansion and contraction and then being broken.

Figure 3C:
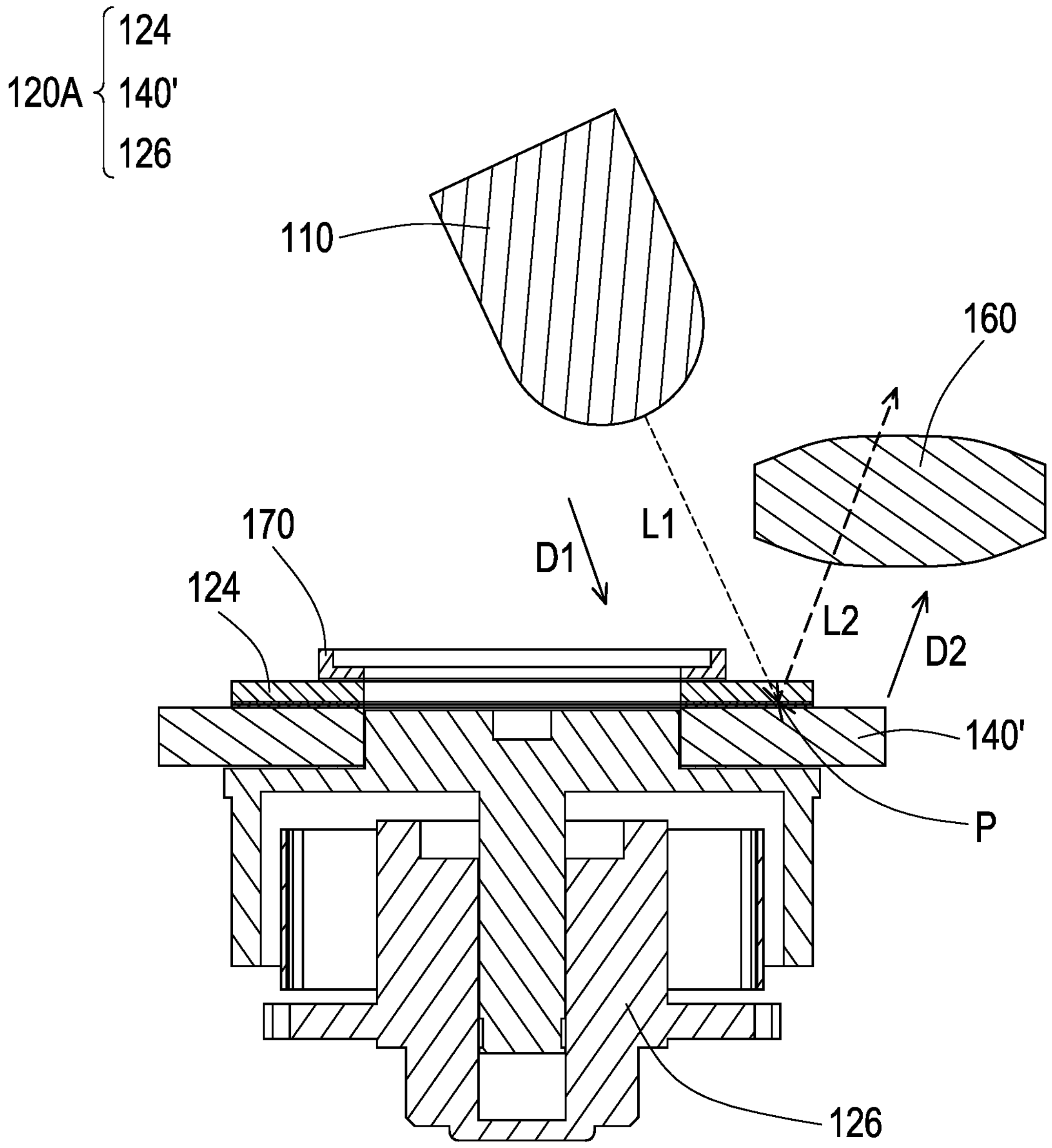
FIG. 3C is a schematic cross-sectional view of FIG. 3A taken along a section line B-B.

FIG. 3C is a schematic cross-sectional view of FIG. 3A taken along a section line B-B. Similar to the reflection and diffusion manner of the reflective diffusion device 120, in the reflective diffusion device 120A provided in the embodiment, the laser beam L1 is emitted from the light source module 110, is firstly incident to the position P of the diffusion element 124 along the incident direction D1 and transmitted to the reflective element 140 (FIG. 2B), is reflected by the reflective element 140, and exits from the diffusion element 124 in the exit direction D2 to generate the diffusion beam L2.

Figure 4A:
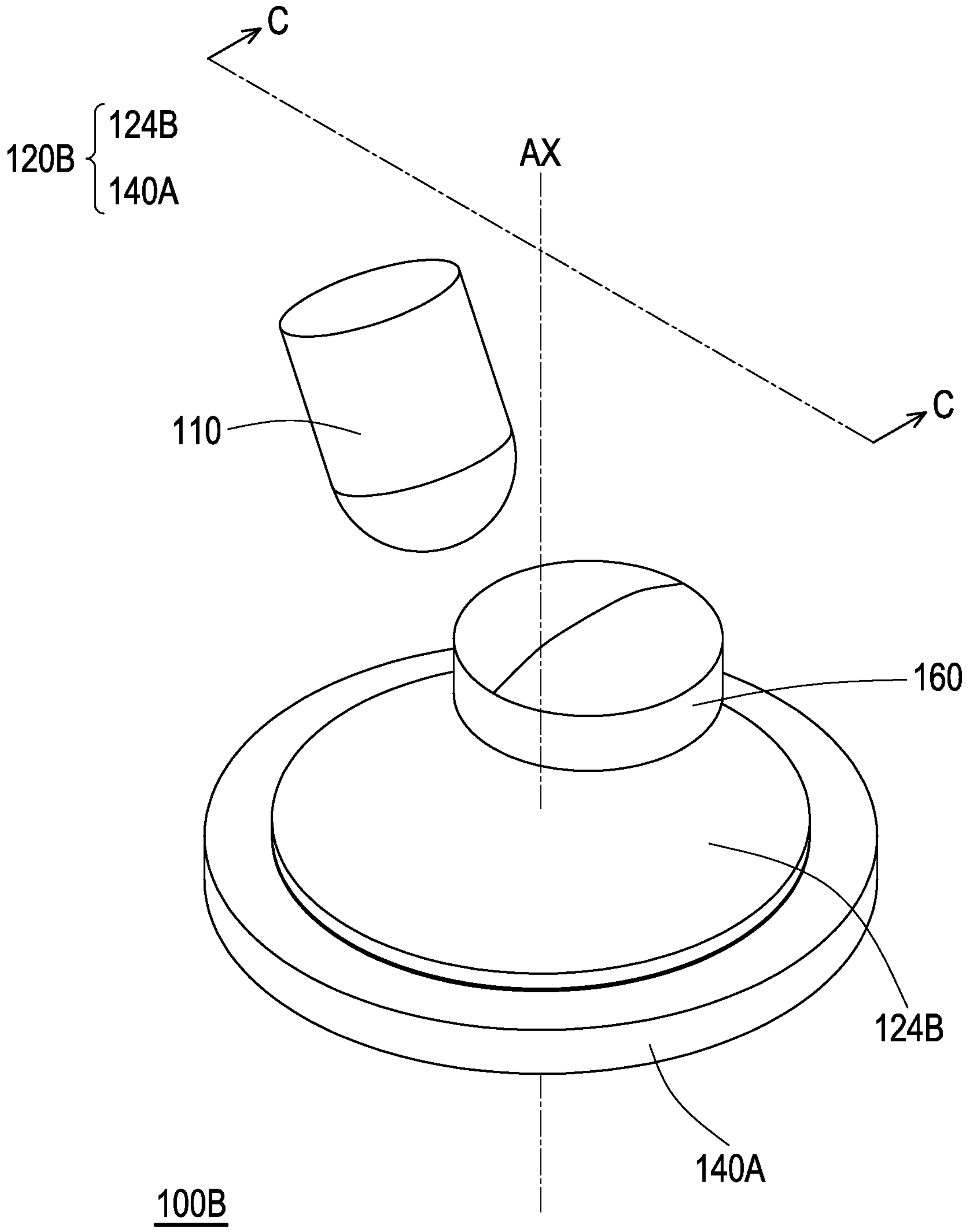
FIG. 4A is a schematic three-dimensional view of a portion of an illumination module according to another embodiment of the invention.
Figure 4B:
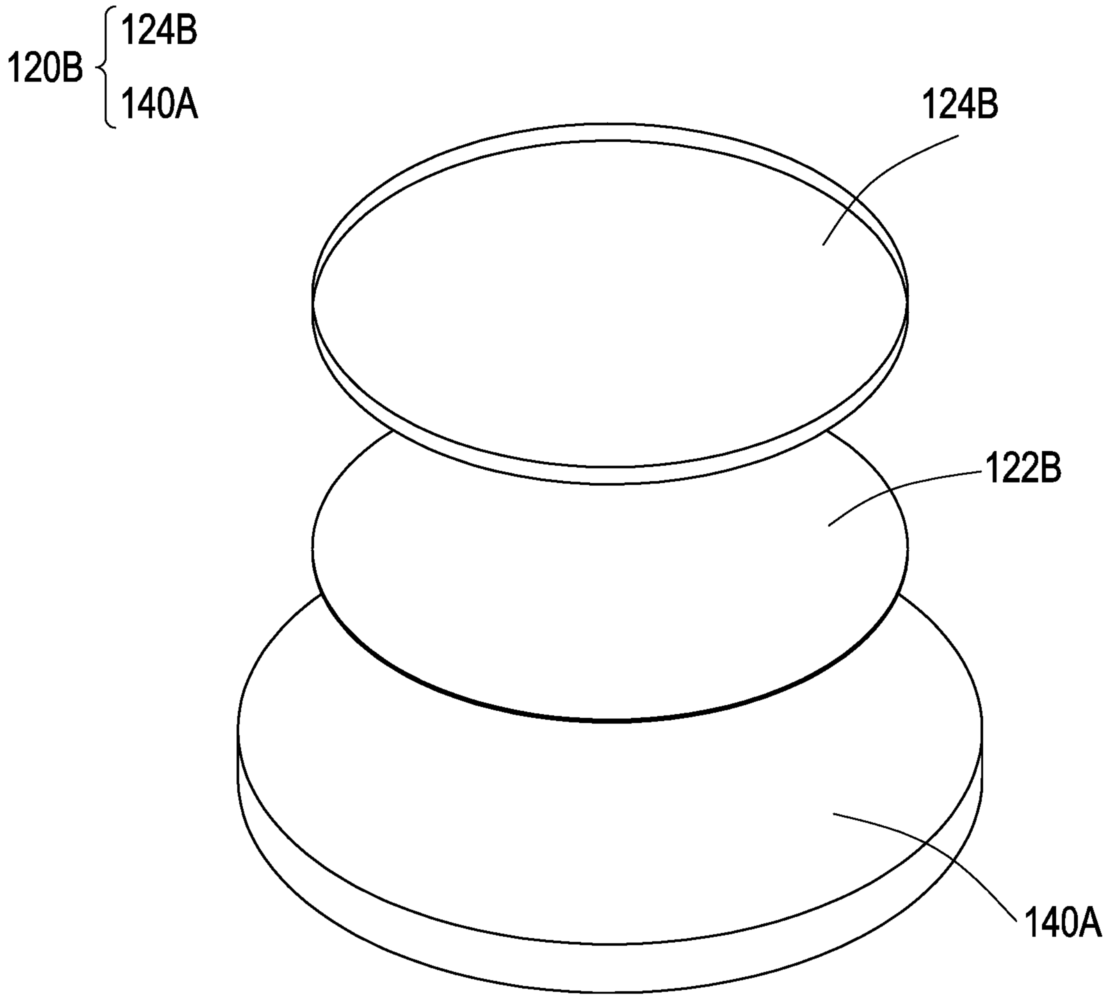
FIG. 4B is a schematic exploded view of FIG. 4A.

FIG. 4A is a schematic three-dimensional view of a portion of an illumination module according to another embodiment of the invention. FIG. 4B is a schematic exploded view of FIG. 4A. It should be noted that the light source module and the lens in FIG. 4B are hidden. Please refer to FIG. 4A and FIG. 4B. An illumination module 100B provided in the embodiment is similar to the illumination module 100, while the difference therebetween lies in that the reflective diffusion device 120B of the illumination module 100B is not equipped with the driving element 126 but is equipped with a reflective element 140A. In other words, the reflective element 140A (FIG. 4B) and the diffusion element 124B of the reflective diffusion device 120B remain stationary during the operation of the illumination module 100B. Since the reflective diffusion device 120B of the illumination module 100B does not have the driving element 126 and does not need the weight block 170, space and costs may be further reduced.

Figure 4C:
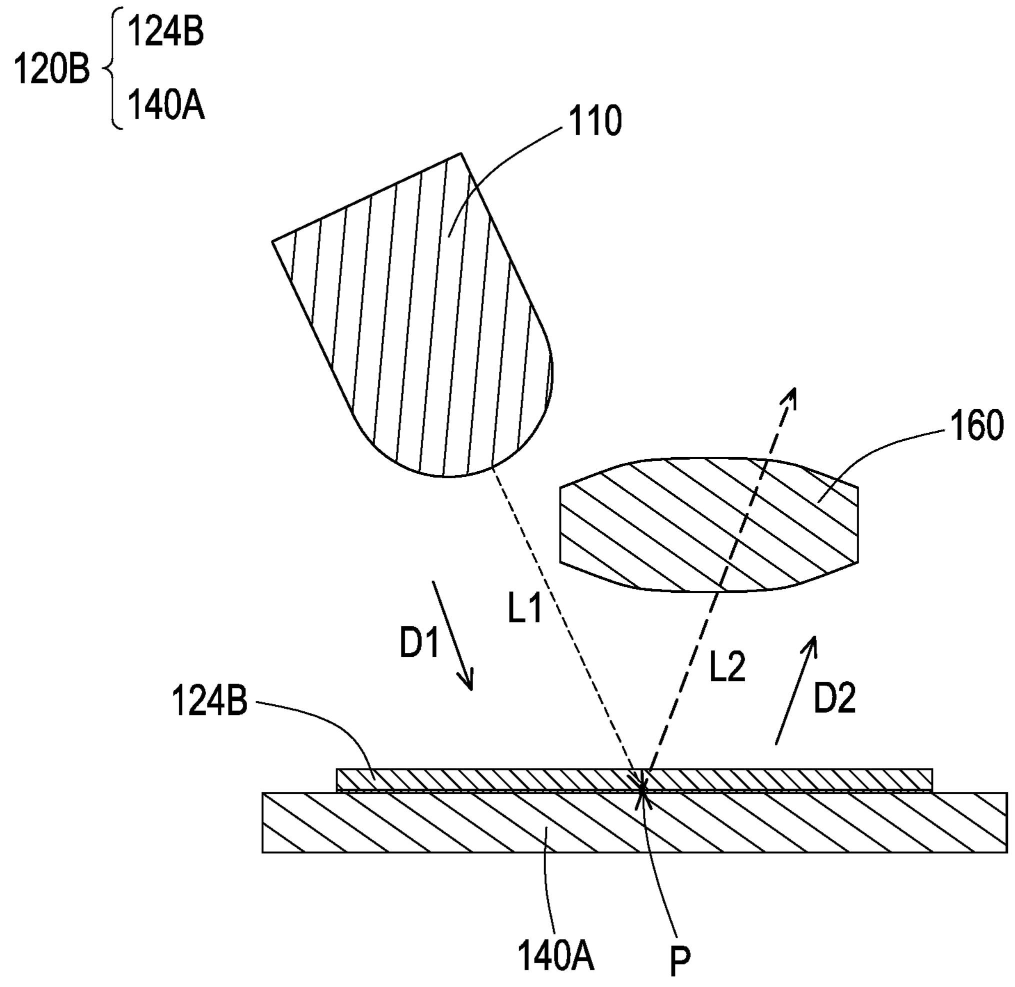
FIG. 4C is a schematic cross-sectional view of FIG. 4A taken along a section line C-C.

FIG. 4C is a schematic cross-sectional view of FIG. 4A taken along a section line C-C. Similar to the reflection and diffusion manner of the reflective diffusion device 120, the laser beam L1 is emitted from the light source module 110, is firstly incident to the position P of the diffusion element 124B along the incident direction D1 and transmitted to the reflective element 140A, is reflected by the reflective element 140A, and exits from the diffusion element 124B in the exit direction D2 to generate the diffusion beam L2.

The diffusion element 124B provided in the embodiment is fixed to one side of the reflective element 140A facing the light source module 110. Through the reflective element 140A, the heat generated by the laser beam L1 entering the reflective element 140A may be dissipated to prevent the reflective diffusion device 120B from being overheated. In other embodiments, the reflective diffusion device 120B may further include a reflective layer 122B disposed between the reflective element 140A and the diffusion element 124B and configured to enhance the light reflection effect of the reflective element 140.

Figure 5A:
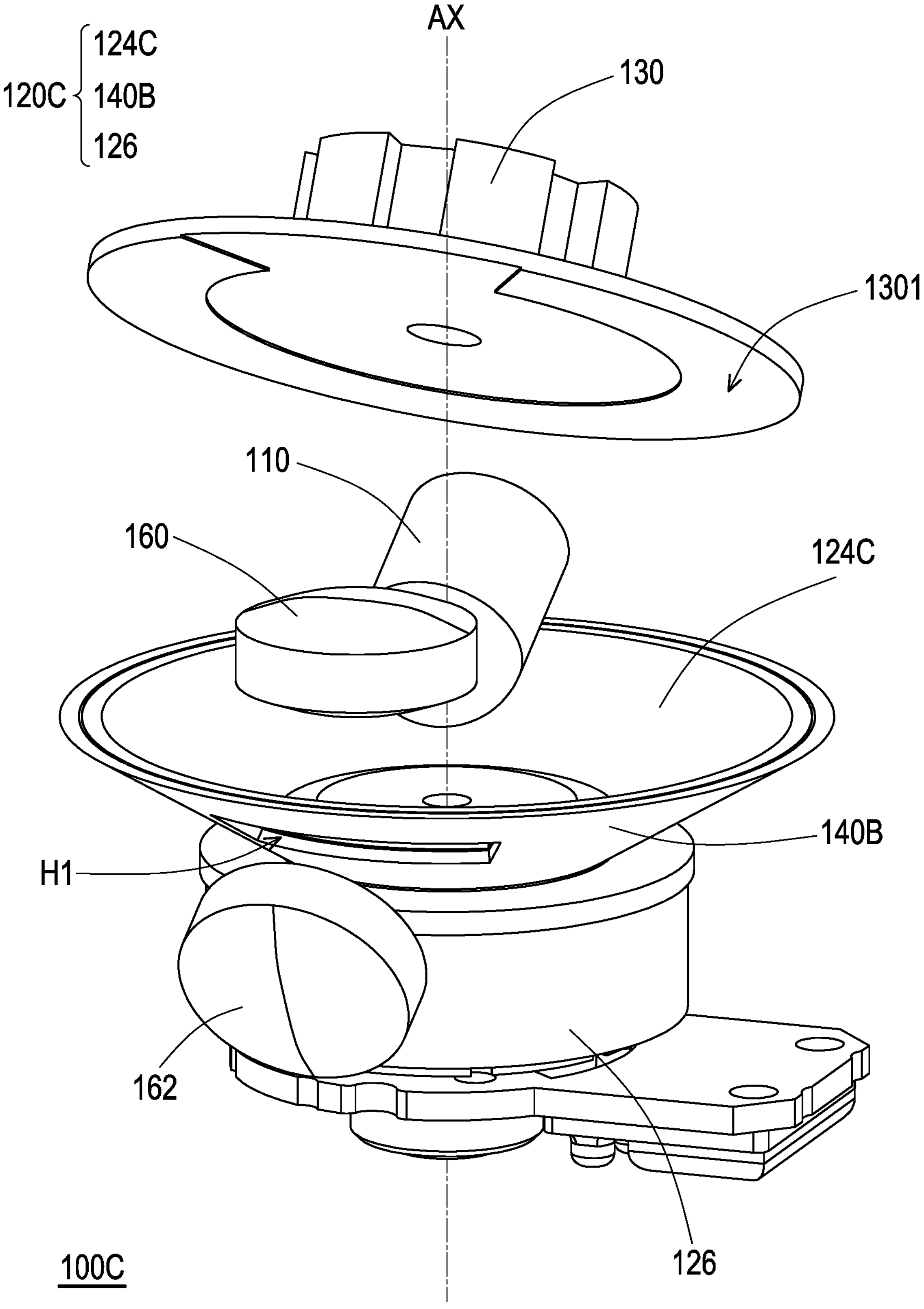
FIG. 5A is a schematic three-dimensional view of a portion of an illumination module according to another embodiment of the invention.
Figure 5B:
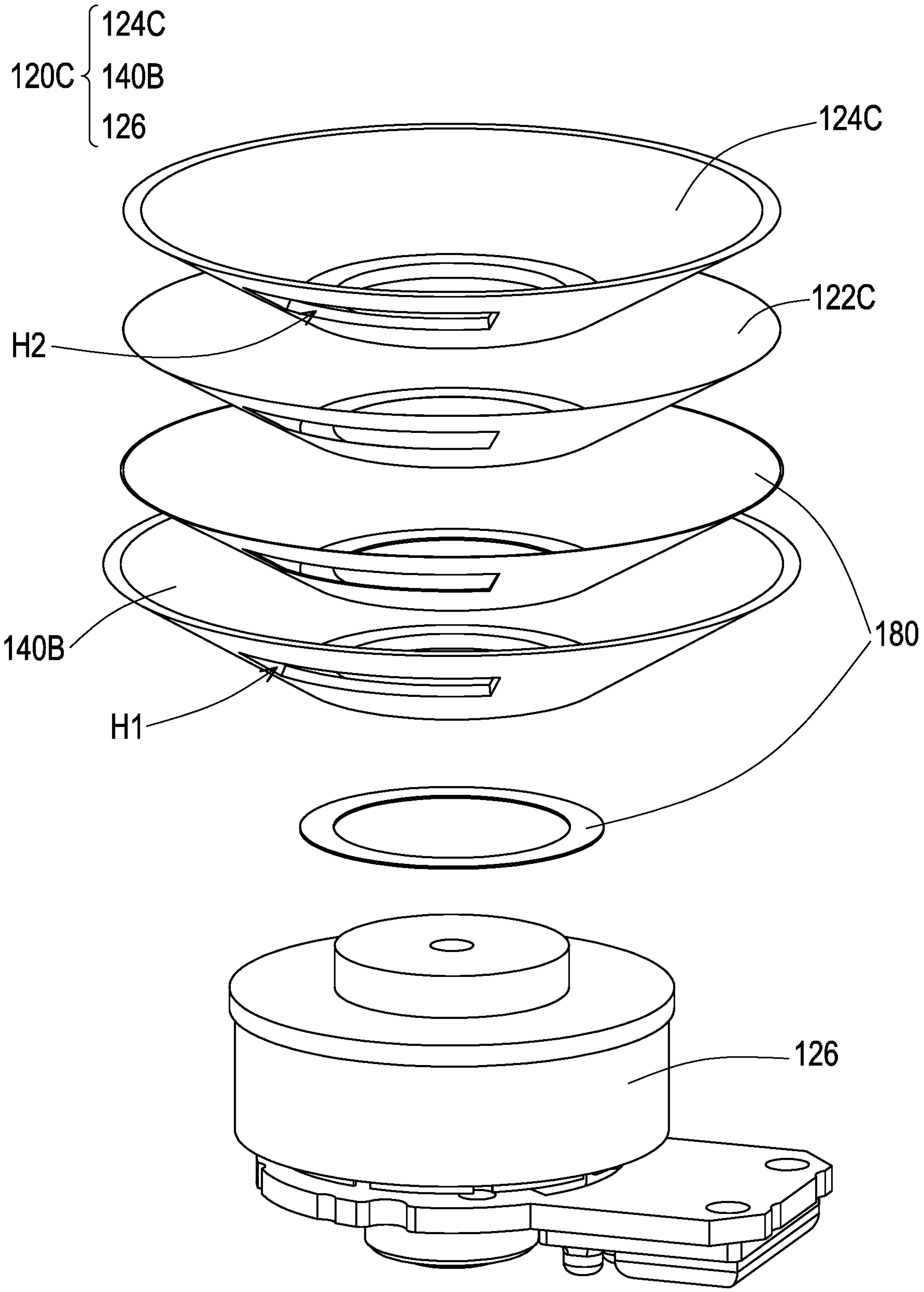
FIG. 5B is a schematic exploded view of FIG. 5A.

FIG. 5A is a schematic three-dimensional view of a portion of an illumination module according to another embodiment of the invention. FIG. 5B is a schematic exploded view of FIG. 5A. It should be noted that the light source module, the lens, and the wavelength conversion device in FIG. 5B are hidden. Please refer to FIG. 5A and FIG. 5B. An illumination module 100C provided in the embodiment is similar to the illumination module 100A, while the difference therebetween lies in that the reflective element 140B of the reflective diffusion device 120C is at least one portion of a conical surface, where the at least one portion of the conical surface refers to a ring-shaped conical surface formed by truncating an apex of a corn. The diffusion element 124C is conformal to the reflective element 140B and appears to be at least one portion of a conical surface.

The reflective element 140B includes a first opening H1, and the diffusion element 124C includes a second opening H2 corresponding to first opening H1 (FIG. 5B). The adhesive layer 180 also has an opening corresponding to the first opening H1 and the second opening H2. It should be noted that the area of the first opening H1 provided in the embodiment is equal to the area of the second opening H2, but the relationship between the two areas is not limited to what is disclosed herein and depends on the actual design requirements.

In the embodiment, an illumination module 100C further includes the wavelength conversion device 130. The wavelength conversion device 130 includes a wavelength conversion region 1301, which is, for instance, a yellow phosphor region configured to excite yellow light, but the wavelength conversion type is not limited to what is disclosed herein. In other embodiments, the reflective diffusion device 120C may further include a reflective layer 122C disposed between the reflective element 140B and the diffusion element 124C and configured to enhance the light reflection effect of the reflective element 140B. The reflective layer 122C also has openings corresponding to the first opening H1 and the second opening H2.

Figure 6A:
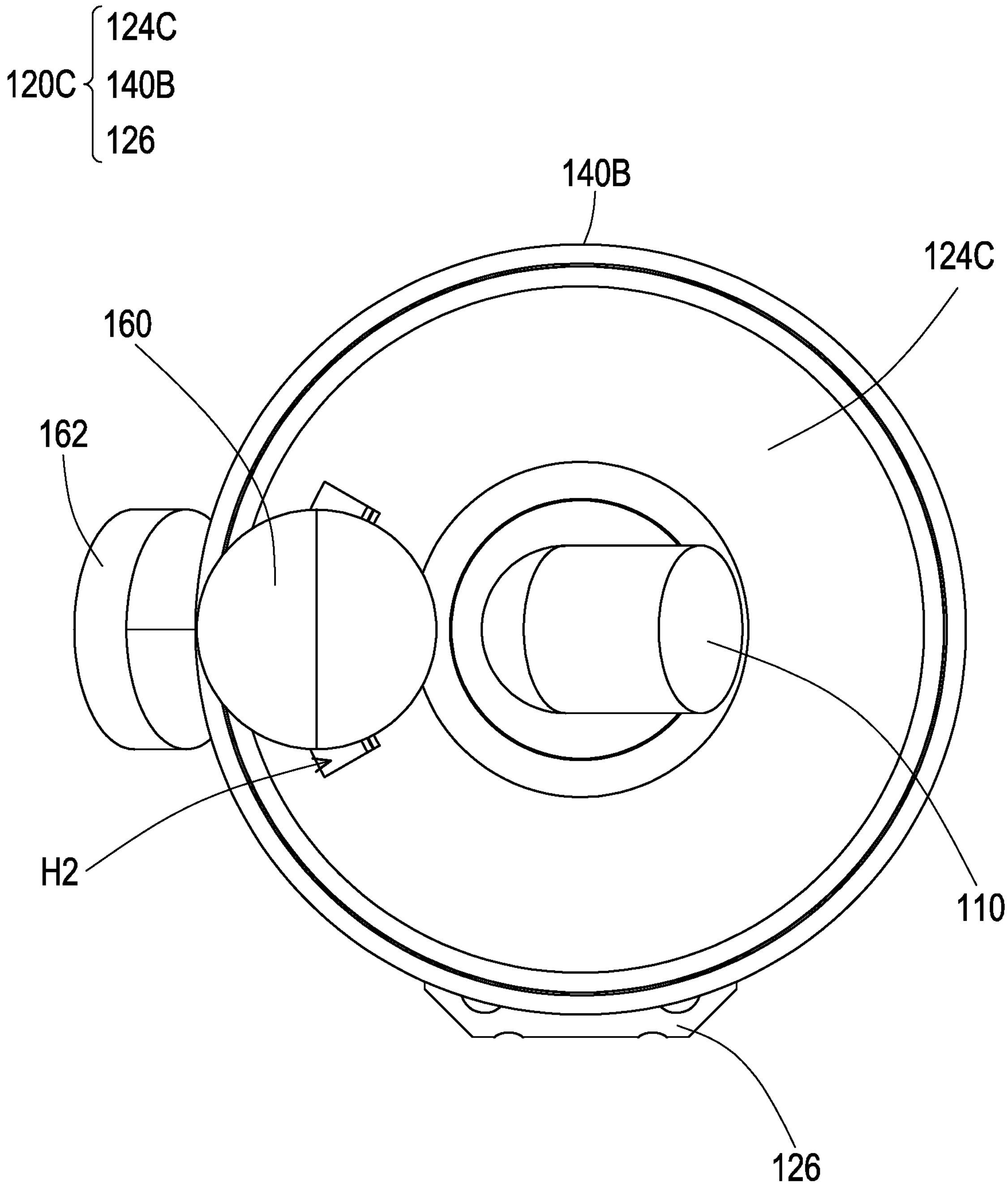
FIG. 6A is a top view of FIG. 5A in a first time sequence.
Figure 6B:
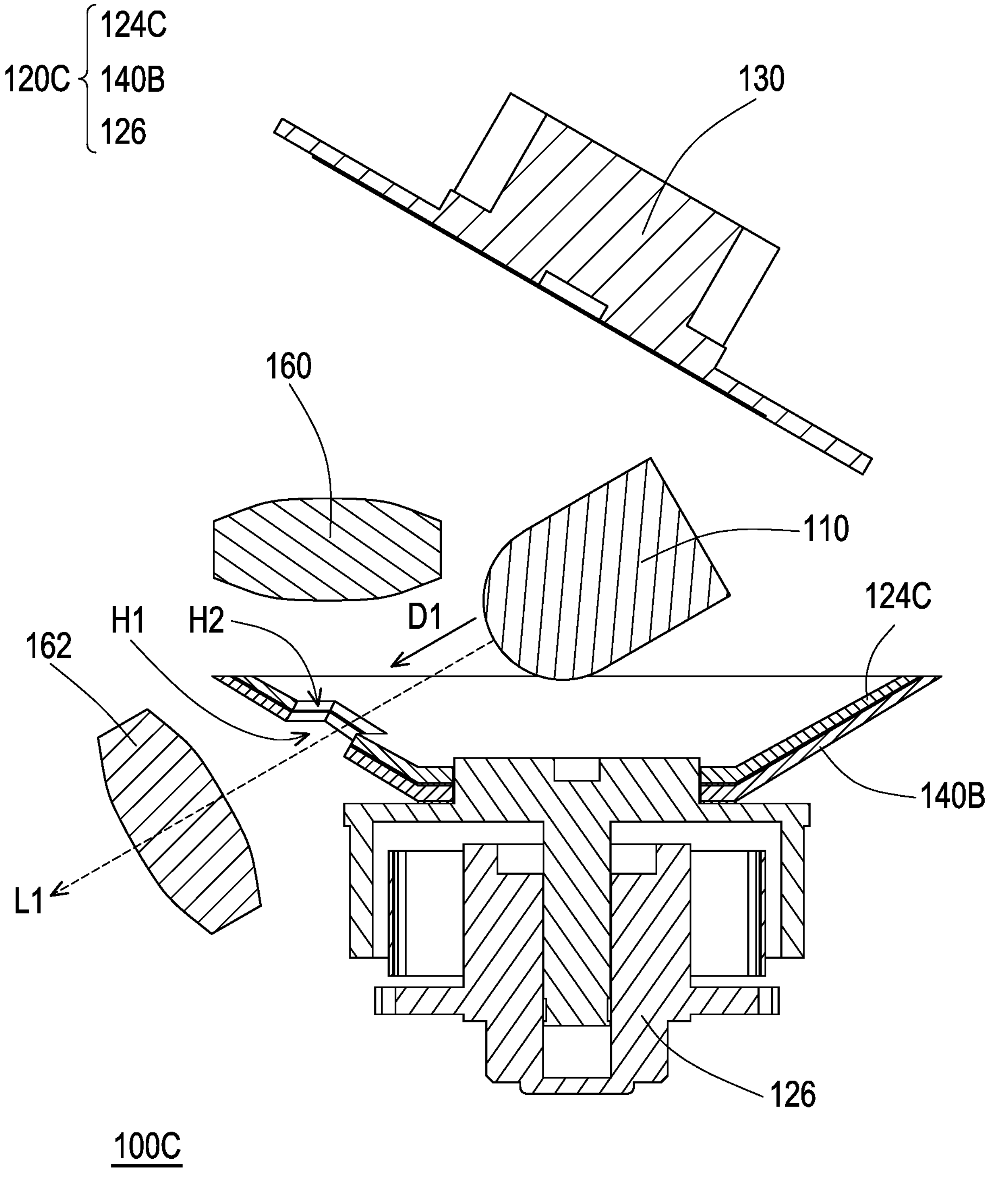
FIG. 6B is a schematic cross-sectional view of FIG. 5A in the first time sequence.
Figure 7A:
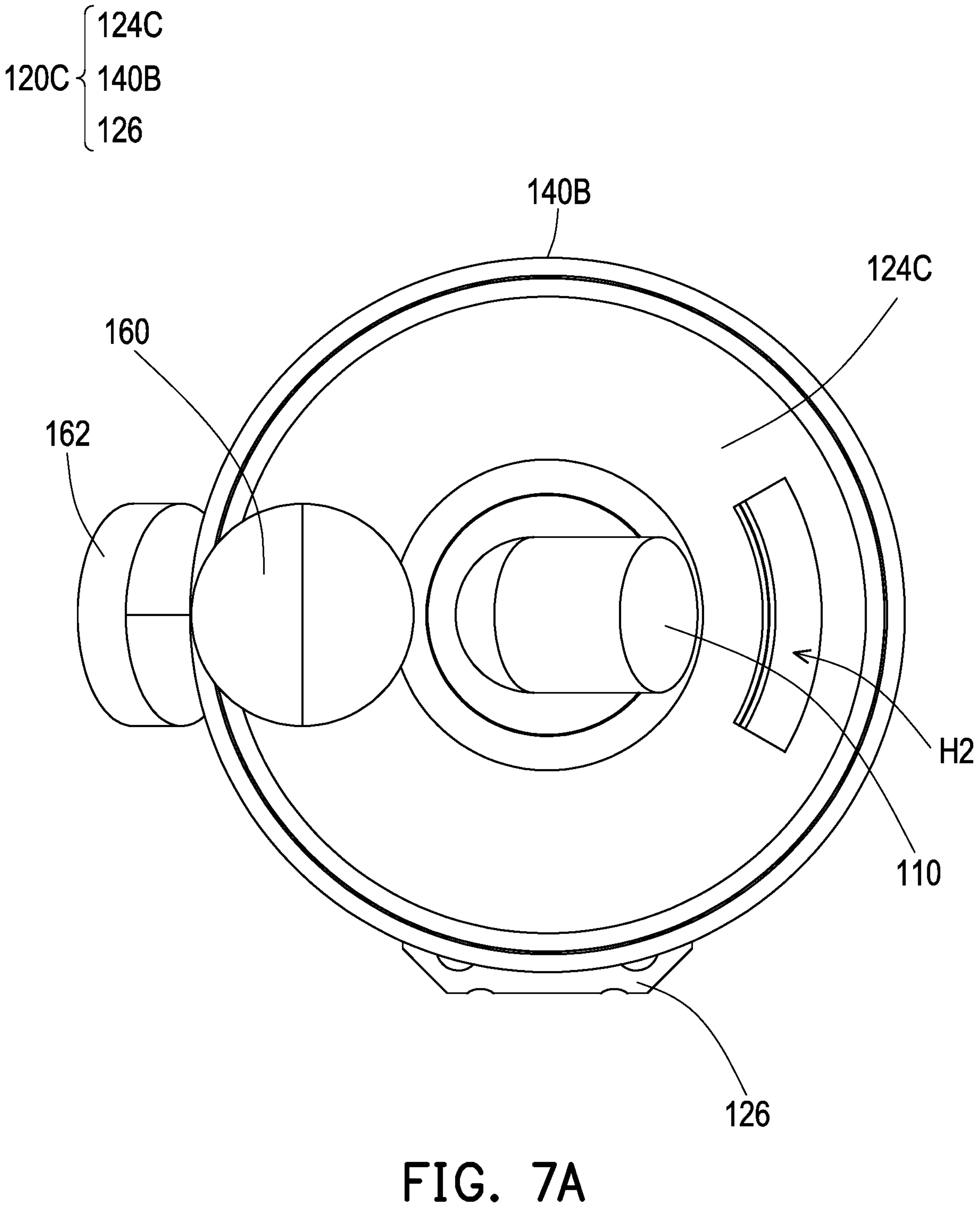
FIG. 7A is a top view of FIG. 5A in a second time sequence.
Figure 7B:
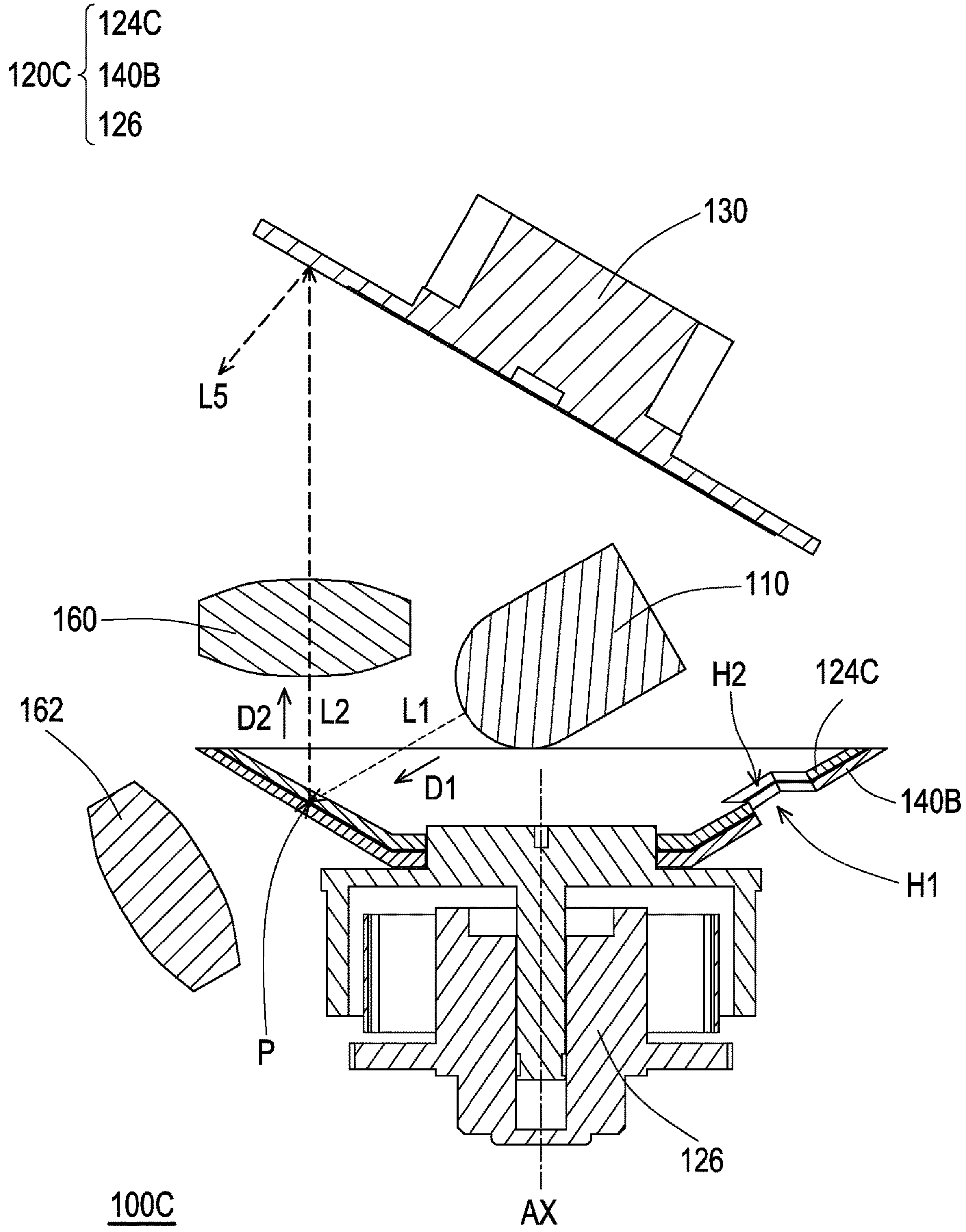
FIG. 7B is a schematic cross-sectional view of FIG. 5A in the second time sequence.

FIG. 6A is a top view of FIG. 5A in a first time sequence. FIG. 6B is a schematic cross-sectional view of FIG. 5A in the first time sequence. FIG. 7A is a top view of FIG. 5A in a second time sequence. FIG. 7B is a schematic cross-sectional view of FIG. 5A in the second time sequence. The wavelength conversion device 130 in FIG. 6A is hidden for clarity of presentation of the reflective diffusion device 120C. The wavelength conversion device 130 in FIG. 7A is hidden for clarity of presentation of the reflective diffusion device 120C. Please refer to FIG. 6A and FIG. 6B, in the embodiment, when the laser beam L1 (FIG. 6B) emitted from the light source module 110 enters the reflective diffusion device 120C, the laser beam L1 may directly pass through the reflective diffusion device 120C, and in this time sequence, the laser beam L1 serves as the illumination beam L3 provided by the illumination module 100C (FIG. 1). Alternately, when the laser beam L1 emitted from the light source module 110 enters the reflective diffusion device 120C, the diffusion beam L2 may be generated without penetrating the reflective diffusion device 120C (FIG. 7B), and the diffusion beam L2 may enter the wavelength conversion device 130 (FIG. 6B) and may be converted into a conversion beam L5 of a different wavelength (FIG. 7B). In this time sequence, the conversion beam L5 serves as the illumination beam L3 provided by the illumination module 100C.

Please refer to FIG. 6B. Specifically, the reflective diffusion device 120C drives the reflective element 140B through the driving element 126, so that the reflective element 140B and the diffusion element 124C are driven to rotate around the central axis AX. In a first time sequence T1, the first opening H1 and the second opening H2 are located on the transmission path of the laser beam L1, the light source module 110 emits the laser beam L1, and the laser beam L1 enters the reflective diffusion device 120C along an incident direction D1, passes through the second opening H2 and the first opening H1, and leaves the reflective diffusion device 120C.

In the embodiment, the illumination module 100C further includes a second lens 162, and the second lens 162 is disposed on the transmission path of the laser beam L1. In the first time sequence, the second lens 162, the light source module 110, the first opening H1, and the second opening H2 are arranged in a linear manner; that is, the second lens 162, the first opening H1, and the second opening H2 are located in the incident direction D1 of the laser beam L1. After the laser beam L1 leaves the reflective diffusion device 120C, the laser beam L1 passes through the second lens 162 and then enters the subsequent light path system to be further utilized and processed in this time sequence, the laser beam L1 serves as the illumination beam L3 provided by the illumination module 100C (FIG. 1). The second lens 162 and the first lens 160 provided in the embodiment may refer to the same lens or may be different lenses.

With reference to FIG. 7A, in a second time sequence T2, the first opening H1 (FIG. 7B) and the second opening H2 are rotated away from the first lens 160, so that the first opening H1 and the second opening H2 are not on the transmission path of the laser beam L1 (FIG. 7B).

With reference to FIG. 7B, in the second time sequence T2, when the laser beam L1 enters the reflective diffusion device 120C along the incident direction D1, the laser beam L1 does not pass through the first opening H1 and the second opening H2. Instead, the laser beam L1 is incident to the position P of the diffusion element 124C and transmitted to the reflective element 140B, is reflected by the reflective element 140B, and exits from the diffusion element 124C in the exit direction D2 to generate the diffusion beam L2. Besides, in the embodiment, the wavelength conversion device 130 and the driving element 126 rotate synchronously, and the wavelength conversion region 1301 (FIG. 5A) cuts into the transmission path of the diffusion beam L2 in the second time sequence, so that the diffusion beam L2 enters the wavelength conversion region 1301 of the wavelength conversion device 130 and is then converted into, for instance, the yellow conversion beam L5. In this time sequence, the conversion beam L5 serves as the illumination beam L3 provided by the illumination module 100C (FIG. 1).

In the embodiment, the wavelength conversion region 1301 corresponds to a region in the reflective element 140B where no first opening H1 is formed, and the region corresponds to a region in the diffusion element 124C where no second opening H2 is formed. As a result, the distribution range of the wavelength conversion region 1301 may be determined according to the size of the first opening H1 and the size of the second opening H2, and a region of the wavelength conversion device 130 corresponding to the first opening H1 and the second opening H2 does not have the wavelength conversion region 1301, for instance, a non-wavelength conversion region of the wavelength conversion device 130 corresponding to the first opening H1 and the second opening H2, so as to further reduce costs.

In the illumination module 100C provided in the embodiment, the design of the openings of the reflective element 140B and the diffusion element 124C allows the laser beam L1 to directly pass through and leave the reflective diffusion device 120C to be further utilized and processed, given that it is not necessary to diffuse the laser beam L1. When the laser beam L1 is required to be diffused, the laser beam L1 enters the reflective diffusion device 120C, and after the laser beam L1 is diffused twice by the diffusion element 124C, the laser beam L1 becomes the diffusion beam L2 with favorable diffusion effect and then enters the wavelength conversion device 130 and is converted into the conversion beam of a different wavelength. That is, through the synchronization of the reflective diffusion device 120C and the wavelength conversion device 130, the illumination module 100C may emit different illumination beams L3 in different time sequences, and the flexibility of the light path design is improved.

To sum up, the reflective diffusion device provided in one or more embodiments of the invention includes the driving element, the reflective element, and the diffusion element and is adapted to reflect and diffuse the laser beam emitted from the light source module. The driving element drives the reflective element and the diffusion element to rotate along the central axis of the reflective element. Through the cooperation of the reflective element and the diffusion element, the incident laser beam and the emergent diffusion beam are located on the same side of the reflective diffusion device, which is conducive to space utilization and enhances flexibility of the light path design. Besides, the laser beam passes through the diffusion element at least twice, which may achieve a more favorable light beam diffusion effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical disclosure of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the invention is intended to be dedicated to the public regardless of whether the element or component is explicitly recited in the following claims.

What is claimed is:

1. A reflective diffusion device, configured to reflect and diffuse a laser beam emitted from a light source module and comprising: a driving element, a reflective element, and a diffusion element, wherein, the driving element has a rotation shaft;

the reflective element comprises a central axis and is disposed on the driving element, and the central axis and the rotation shaft are collinear; and the diffusion element is disposed on at least one portion of the reflective element, wherein the driving element is configured to drive the reflective element and the diffusion element to rotate along the central axis, the laser beam enters the diffusion element along an incident direction, is transmitted to the reflective element, is reflected by the reflective element, and exits from the diffusion element along an exit direction to generate a diffusion beam, an incident angle exists between the incident direction and the central axis, an emergent angle exists between the exit direction and the central axis, the incident angle is greater than 0 degree, and the emergent angle is greater than or equal to 0 degree, wherein the reflective element comprises a first opening, the diffusion element comprises a second opening corresponding to the first opening, the first opening and the second opening are located on a transmission path of the laser beam, the driving element drives the reflective element to rotate, in a first time sequence, the laser beam passes through the second opening and the first opening, and in a second time sequence, the laser beam enters the diffusion element, is transmitted to the reflective element, is reflected by the reflective element, and exits from the diffusion element.

2. The reflective diffusion device according to claim 1, wherein the reflective element comprises at least one portion of a conical surface or a bowl-shaped curved surface, and the diffusion element is conformal to the at least one portion of the conical surface or the bowl-shaped curved surface of the reflective element.

3. The reflective diffusion device according to claim 1, wherein the reflective element is an end portion of the driving element and surrounds the rotation shaft.

4. The reflective diffusion device according to claim 1, wherein the reflective element is a ring-shaped heat dissipation substrate and is sleeved on the rotation shaft of the driving element.

5. The reflective diffusion device according to claim 4, wherein an outer diameter of the reflective element is greater than or equal to an outer diameter of the driving element.

6. The reflective diffusion device according to claim 1, wherein an outer diameter of the diffusion element is less than or equal to an outer diameter of the reflective element.

7. The reflective diffusion device according to claim 1, wherein the diffusion element comprises microstructures located on a surface of the diffusion element, or/and the diffusion element comprises an atomization layer having scattered particles inside.

8. A projection device, comprising: an illumination module, a light valve, and a projection lens, wherein the illumination module is configured to provide an illumination beam, the light valve is disposed on a path of the illumination beam to convert the illumination beam into an image beam, the projection lens is disposed on a path of the image beam and configured to project the image beam out of the projection device, and the illumination module comprises:

a light source module, configured to emit a laser beam;

a reflective diffusion device, comprising: a driving element, a reflective element, and a diffusion element, wherein the driving element has a rotation shaft;

the reflective element comprises a central axis and is disposed on the driving element, and the central axis and the rotation shaft are collinear; and the diffusion element is disposed on at least one portion of the reflective element, wherein the driving element is configured to drive the reflective element and the diffusion element to rotate along the central axis, the laser beam enters the diffusion element along an incident direction, is transmitted to the reflective element, is reflected by the reflective element, and exits from the diffusion element along an exit direction to generate diffusion beam, an incident angle exists between the incident direction and the central axis, an emergent angle exists between the exit direction and the central axis, the incident angle is greater than 0 degree, and the emergent angle is greater than or equal to 0 degree; and a wavelength conversion device, disposed on a path of the diffusion beam to convert the diffusion beam into a conversion beam, wherein the conversion beam transmitted out of the illumination module serves as the illumination beam provided by the illumination module, wherein the reflective element comprises a first opening, the diffusion element comprises a second opening corresponding to the first opening, the driving element drives the reflective element to rotate, in a first time sequence, the laser beam passes through the second opening and the first opening, and in a second time sequence, the laser beam enters the diffusion element, is transmitted to the reflective element, is reflected by the reflective element, and exits from the diffusion element.

9. The projection device according to claim 8, wherein the reflective element comprises at least one portion of a conical surface or a bowl-shaped curved surface, and the diffusion element is conformal to the at least one portion of the conical surface or the bowl-shaped curved surface of the reflective element.

10. The projection device according to claim 8, wherein the reflective element is an end portion of the driving element and surrounds the rotation shaft.

11. The projection device according to claim 8, wherein the reflective element is a ring-shaped heat dissipation substrate and is sleeved on the rotation shaft of the driving element.

12. The projection device according to claim 11, wherein an outer diameter of the reflective element is greater than or equal to an outer diameter of the driving element.

13. The projection device according to claim 8, wherein an outer diameter of the diffusion element is less than or equal to an outer diameter of the reflective element.

14. The projection device according to claim 8, wherein the diffusion element comprises microstructures located on a surface of the diffusion element, or/and the diffusion element comprises an atomization layer having scattered particles inside.

* * * * *